(12) United States Patent
Lee et al.

(10) Patent No.: US 8,787,613 B2
(45) Date of Patent: Jul. 22, 2014

(54) FORENSIC MARK INSERTION APPARATUS AND METHOD

(75) Inventors: Jung Ho Lee, Daejeon (KR); Young Ho Suh, Daejeon (KR); Wonyoung Yoo, Daejeon (KR); Yong-Seok Seo, Daejeon (KR); Sang Kwang Lee, Daejeon (KR); Seungjae Lee, Daejeon (KR); Young-Suk Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 220 days.

(21) Appl. No.: 13/091,569

(22) Filed: Apr. 21, 2011

(65) Prior Publication Data

US 2011/0261997 A1 Oct. 27, 2011

(30) Foreign Application Priority Data

Apr. 22, 2010 (KR) .................. 10-2010-0037365

(51) Int. Cl.
*G06K 9/00* (2006.01)
*G06K 9/36* (2006.01)
*G06K 9/46* (2006.01)

(52) U.S. Cl.
USPC ............ 382/100; 382/232; 382/235; 382/243

(58) Field of Classification Search
USPC ............................................... 382/100, 243
See application file for complete search history.

(56) References Cited

U.S. PATENT DOCUMENTS

| | | | |
|---|---|---|---|
| 5,915,027 A * | 6/1999 | Cox et al. ..................... | 380/54 |
| 2005/0097331 A1 | 5/2005 | Majidimehr et al. | |
| 2005/0169498 A1 | 8/2005 | Choi et al. | |
| 2006/0200416 A1 * | 9/2006 | White et al. ................... | 705/50 |
| 2007/0012782 A1 | 1/2007 | Winograd | |
| 2008/0219496 A1 * | 9/2008 | Tewfik et al. ................ | 382/100 |
| 2009/0136087 A1 * | 5/2009 | Oren et al. ................... | 382/100 |

FOREIGN PATENT DOCUMENTS

| | | |
|---|---|---|
| KR | 10-2005-0040697 | 5/2005 |
| KR | 1020050078767 A | 8/2005 |
| KR | 1020090026482 A | 3/2009 |
| KR | 1020090057596 A | 6/2009 |
| KR | 1020090079045 A | 7/2009 |

* cited by examiner

*Primary Examiner* — Matthew Bella
*Assistant Examiner* — Weiwen Yang
(74) *Attorney, Agent, or Firm* — Kile Park Reed & Houtteman PLLC

(57) ABSTRACT

A forensic mark insertion apparatus includes: an original content segment storage unit for storing multiple original contents; and a service control unit for, in response to a request for a content from a user, retrieving an original content corresponding to the request for the content from the original content segment storage unit, separating the retrieved original content into plurality of content segments, selectively inserting a forensic mark into some of the content segments, and assembling the content segments to produce an forensic-mark inserted content to be provided to the user.

10 Claims, 4 Drawing Sheets

FORENSIC MARK INSERTION APPARATUS AND METHOD

CROSS-REFERENCE(S) TO RELATED APPLICATION

The present invention claims priority of Korean Patent Application No. 10-2010-0037365, filed on Apr. 22, 2010, which is incorporated herein by reference.

FIELD OF THE INVENTION

The present invention relates to a multimedia content providing system, and more particularly, to an apparatus and method for inserting a forensic mark into a content for use in a multimedia content providing system, capable of minimizing standby time when the content is provided in response to a user request.

BACKGROUND OF THE INVENTION

In recent years, development of communication environments and digital equipment is creating a huge demand for digital content. However, the majority of movie and music contents having MP3 format, Divx format and the like is being illegally shared across online service providers (OSPs), and thus copyright infringement is increasing more and more.

Moreover, with the advent of Web 2.0 era, users who have been merely consumers of digital content are turning into active producers through user created content (UCC), leading to a rapid increase in the use of existing works such as movies or dramas.

To prevent such copyright infringement, the protection on copyright is strengthening crackdown on the illegal distribution of the digital contents, and is compelling the OSPs to deal with illegal infringement of copyright by technical protection measures. Thus, the OSPs are utilizing a forensic marking technique, which is one of the technical protection measures.

The forensic marking technique is to insert information about a seller, copyright holder, or purchaser into a digital content of a video or audio source, which can extract the previously inserted information even if a user modifies the digital content in other forms for ulterior purposes.

By inserting the information into the digital content, when copyright leakage takes place later, it is possible to track the first circulator of the digital content and place blame on him/her, and it is also possible to raise public awareness on copyright protection. This technology is not only available for a particular device or single authorized device, such as an existing DRM (Digital Rights Management), but also freely available for all devices, and may be modified or processed depending on individual purposes. Thus, much research is actively being done due to the advantage of not restricting the user rights of use.

The process of inserting a forensic mark into multimedia content using this technique includes: decoding the entire of the multimedia content, inserting a forensic mark into the decoded entire multimedia content, and re-encoding the content having the forensic mark inserted therein. Therefore, such a process requires a considerably large amount of computation and time.

Moreover, in an ultra-high speed communication network which is currently used at home, transmission time is short to such an extent that the time taken to transmit multimedia content provided by an OSP to a purchaser is several seconds to several minutes. Since, however, it takes long time to insert a forensic mark into the multimedia content, it is impossible to insert the forensic mark at a point of time when a request from a purchaser is made. Therefore, the multimedia contents currently in service should be prepared with a forensic mark inserted therein in advance before a request from a purchaser was made. Hence, the multimedia content of this type does not have information, such as purchaser ID, transmission point of time or the like.

One of the related arts discloses a technique in which a multimedia content with a watermark inserted therein is prepared in advance before a user's request is made, and upon receiving a user's request, identification information of a user is associated with identification information of the multimedia content with the watermark inserted therein, and then the multimedia content having the watermark associated with the identification information of a user is provided to the user. This technique can satisfy the basic requirements of ultra-high speed services because the multimedia content having the watermark is prepared in advance and, upon a user's request, the multimedia content having the watermark can be transmitted in real time.

In addition, for a popular new content, a large number of purchase requests may be made within a short time. To cope with the large number of purse requests, a space for storing an enormous amount of identical copy versions of the popular content with different watermarks is required. However, if prospect of purchasing demand goes wrong, the storage space may be wasted or the identical copy versions of the popular content may be sold out. Moreover, since a watermark contains no purchaser information but identification information having no meaning, it is necessary to use a matching table to identify original purchasers when tracking illegally shared content later.

SUMMARY OF THE INVENTION

In view of the above, the present invention provides an apparatus and a method for inserting a forensic mark in an original multimedia content, capable of minimizing standby time when the content is provided in response to a user's request.

In accordance with a first aspect a forensic mark insertion apparatus including: an original content storage unit for storing multiple original contents; and a service control unit for, in response to a request for content from a user, retrieving an original content corresponding to the request from the original content storage unit, segmenting the retrieved original content into a plurality of content segments, selectively inserting a forensic mark into some of the content segments, and assembling the content segments having the forensic mark and without having the forensic mark to produce an forensic-mark inserted content.

In accordance with a second aspect a forensic mark insertion apparatus including: a content segment storage unit for storing one or more groups of plural first sets of content segments and one or more second sets of content segments, which are derived from corresponding original contents. Each original content has a plurality of content segments, the plurality of content segments being classified into a first set of content segments into which a forensic mark will be inserted and a second set of second content segments into which a forensic mark will not be inserted.

The plural first sets of content segments include copies duplicated from the first set of (original) content segments segmented from the original content, a forensic mark being inserted into content segments in each copy.

The forensic marks inserted in each copy differs from one another; and a service control unit, in response to a request for content from a user, for partially extracting pieces from the content segments of which contents are identical in the respective copies on a basis of information on the user, collecting the extracted pieces together to obtain a first set of content segments, and assembling the obtained first set of content segments and the second set of content segments in the original content to produce a forensic-mark inserted content.

In accordance with a third aspect a forensic mark insertion method including: retrieving, in response to a request for content from a user, an original content corresponding to the request for content; segmenting the retrieved original content into a plurality of content segments; inserting a forensic mark into some of the content segments; assembling the content segments having the forensic mark and the content segments without having the forensic mark to produce a forensic-mark inserted content to be provided to the user.

In accordance with a fourth aspect of A forensic mark insertion method including: preparing one or more groups of plural first sets of content segments and one or more second sets of content segments, which are derived from corresponding original contents, wherein each original content has a plurality of content segments, the plurality of content segments being classified into a first set of content segments into which a forensic mark will be inserted and a second set of second content segments into which a forensic mark will not be inserted.

The plural first sets of content segments include copies duplicated from the first set of (original) content segments segmented from the original content, a forensic mark being inserted into content segments in each copy, and
wherein the forensic marks inserted in each copy differs from one another; partially extracting pieces from the content segments of which contents are identical in the respective copies on a basis of information on the user; collecting the extracted pieces together to obtain a first set of content segments; and assembling the obtained first set of content segments and the second set of content segments in the original content to produce a forensic-mark inserted content.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

The embodiments of the present invention will be described with reference to the accompanying drawings which form a part hereof.

Figure 1:
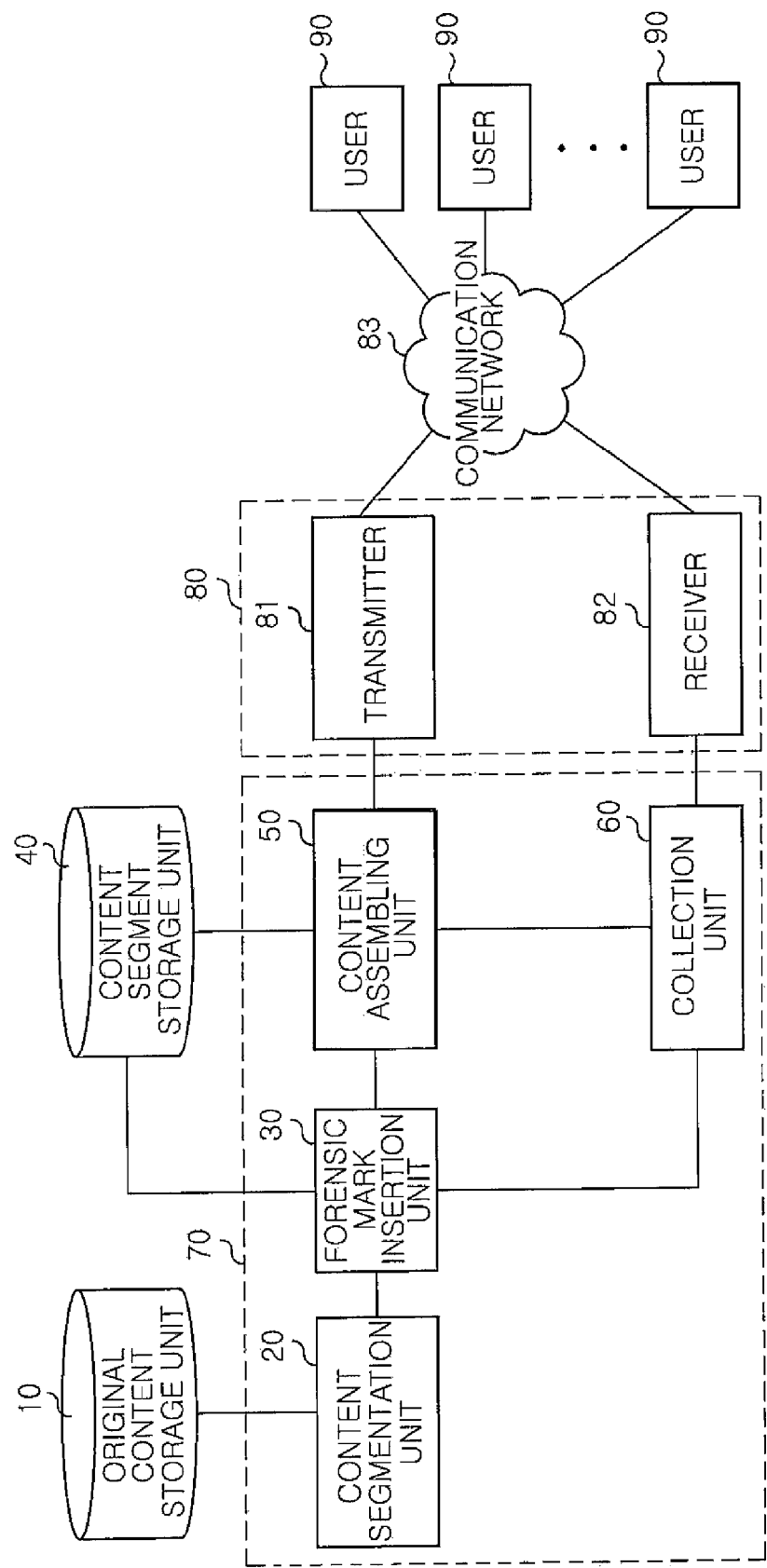
FIG. 1 shows a block diagram of a forensic mark insertion apparatus in accordance with an embodiment of the present invention.

FIG. 1 shows a block diagram of a forensic mark insertion apparatus in accordance with an embodiment of the present invention. As shown in FIG. 1, the forensic mark insertion apparatus includes an original content storage unit 10, a content segment storage unit 40, a service control unit 70, and a communication unit 80. Further, the service control unit 70 has a content segmentation unit 20, a forensic mark insertion unit 30, a content assembling unit 50 and a collection unit 60.

In accordance with the embodiments of the present invention, a content requested by a user 90 can be prepared by following two ways.

In a first way, an original content is segmented into a plurality of content segments and a forensic mark is inserted into some of the content segments. Thereafter, the content segments having the forensic mark are assembled with the content segments without having the forensic mark to produce a forensic-mark inserted content to be provided to the user.

In a second way, first of all, one or more groups of plural first sets of content segments are prepared along with one or more second sets of content segments, wherein the plural first set of content segments and the second set of content segments are derived from corresponding original contents, each of original content having a plurality of content segments, the plurality of content segments being classified into a first set of content segments into which a forensic mark will be inserted and a second set of second content segments into which a forensic mark will not be inserted. Further, the plural first sets of content segments include copies duplicated from the first set of (original) content segments of the original content, a forensic mark being inserted into content segments in each copy, and the forensic marks inserted in each copy being differ from one another.

When a request for content is issued from a user, a forensic-mark inserted content corresponding to the request is obtained by partially extracting pieces from the content segments of which contents are identical in each copy and then combining the extracted pieces together.

Now, the operation of each component of the forensic mark insertion apparatus of the present invention will be described in detail with reference to FIG. 1.

The original content storage unit 10 may be a database storing a plurality of original multimedia contents to be provided to users 90. Such original contents may be multimedia data including audio sources which have been encoded in different file formats, e.g., MP3 (MPEG Audio Layer-3), WMA (Windows Media Audio), WAV (Waveform Audio File Format) and the like, and videos which are also encoded in different file formats, e.g., AVI (Audio Video Interleave), MPG (Moving Picture Experts Group), FLU (Flash Video) and the like.

The service control unit 70 controls the entire operation of the forensic mark insertion apparatus for providing the user with a content having a forensic marks inserted therein.

The content segmentation unit 20 performs a segmentation of an original content requested by the user 90 into a plurality of content segments. The plurality of content segments is classified into a first set of content segments into which a forensic mark is inserted (hereinafter, referred to as "first content segments") and a second set of content segments into which a forensic mark is not inserted (hereinafter, referred to as "second content segments"). For example, in the case of video content, the first set of content segments may include video segments having information on motion of moving objects, scene changes, brightness, or color information of the video content. In the case of audio content, the first set of content segments may include audio segments segmented depending on information about frequency distribution, pitch, or silence interval of the audio content.

Alternatively, an original content may be segmented on a time domain basis. For a 10-minute length content, it may be segmented into from 0 to 3 minute length, from 3 to 6 minute length, or from 6 to 10 minute length with respect to a full playback length thereof. In addition, the first and the second sets of content segments may be randomly segmented without considering the information of the video or audio content.

After the segmentation of the original content, the content segmentation unit 20 decodes the first set of content segments, while leaving the second content segments without decoding.

The forensic mark insertion unit 30 inserts a forensic mark into the first set of decoded content segments. In this regard, the forensic mark is repeatedly inserted in the content segments so that the same forensic mark can be detected at any content segments in the set.

After inserting the forensic mark, the forensic mark insertion unit 30 encodes the first set of decoded content segments by the same codec as that have been conducted in the original content.

In this embodiment, since the original content is segmented into a plurality of content segments, a parallel processing may be performed on of the content segments in order to reduce time taken to decode and encode the content segments.

Thereafter, the content assembling unit 50 assembles the set of the first and the second content segments together to produce a forensic-mark inserted content which has the same playback length as the original content.

Figure 2:
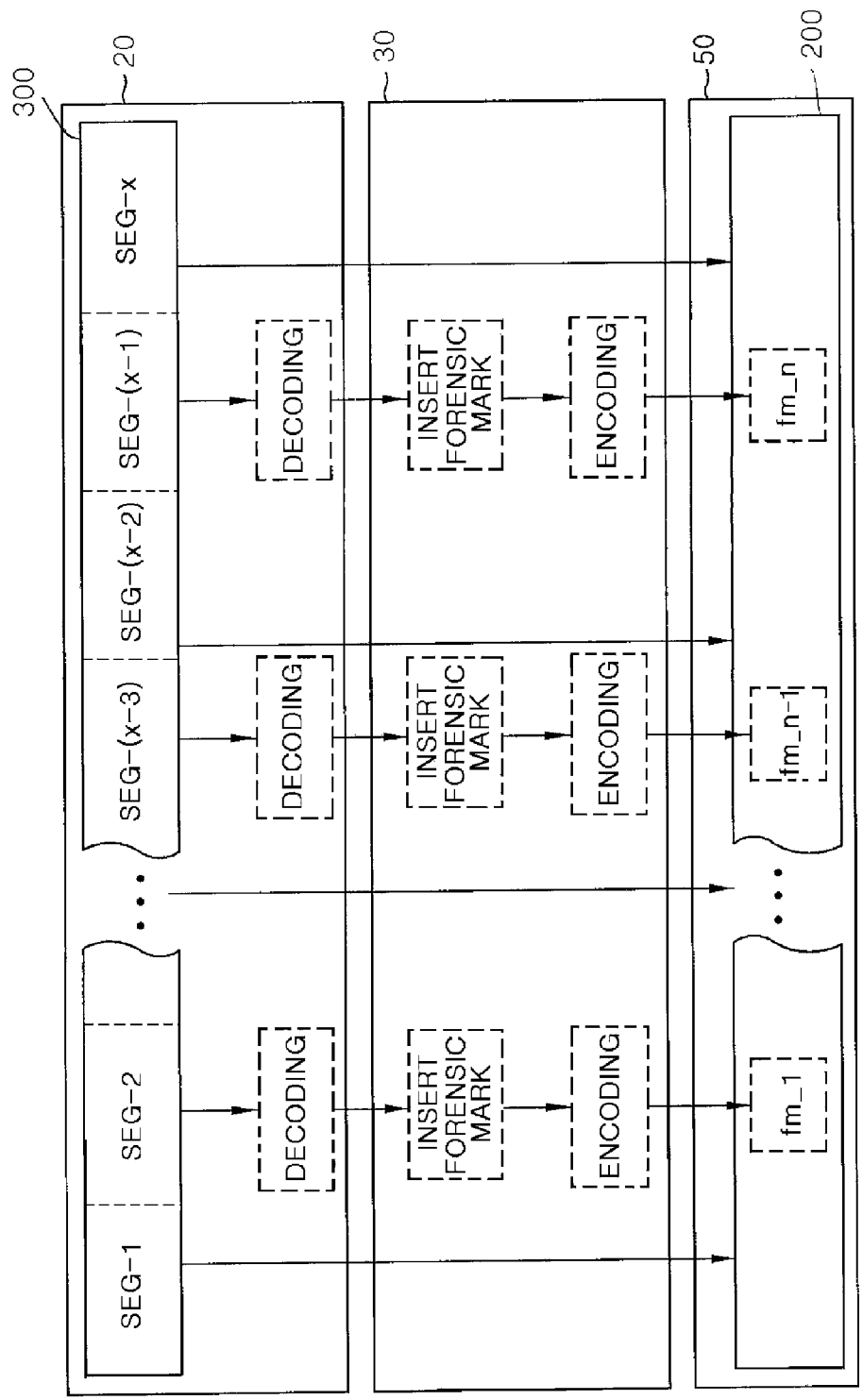
FIG. 2 illustrates a process for the forensic mark insertion in accordance with an embodiment of the present invention.

FIG. 2 schematically illustrates a process for a forensic mark insertion in accordance with the embodiment of the present invention. In order to perform the forensic mark insertion, an original content 300 sequentially passes through the content segmentation unit 20, the forensic mark insertion unit 30 and the content assembling unit 50, thereby producing a forensic-mark inserted content 200.

To be more specific, the content segmentation unit 20 segments the original content 300 into a plurality of content segments SEG-1 to SEG-x. The content segments SEG-1 to SEG-x are classified into a first set of content segments SEG-2, ..., SEG-(x−3), and SEG-(x−1) into which a forensic mark will be inserted and a second set of content segments SEG-1, ..., SEG(x−2) and SEG-x into which a forensic mark will not be inserted. Then, the content segmentation unit 20 decodes the first set of content segments SEG-2, ..., SEG-(x−3) and SEG-(x−1).

The forensic mark insertion unit 30 then inserts a forensic mark into the first set of decoded content segments SEG-2, ..., SEG-(x−3) and SEG-(x−1) and then encodes them to produce the first set of content segments with the forensic mark.

Finally, the content segment unit 50 assembles the first set of content segments with the second set of content segments to produce the forensic-mark inserted content 200.

The collection unit 60 collects data to be inserted into the first set of content segments and provides the collected data to the forensic mark insertion unit 30 where the collected data is used as the forensic mark to be inserted into the first set of content segments. The collected data may include information on the user 90 such as User Id, information on the content requested by the user 90, download information such as download time, download ID, serial number or the like.

In the present invention, a forensic mark may include, for example, 36 kinds of codes inclusive of Alphabet characters A to Z and Arabic numerals 0 to 9, but not limited thereto. The respective codes are inserted in a first set of content segments. For this, 36 copies of the first set of content segments are prepared, and the 36 codes are inserted into the respective copies, to achieve a group of first sets of content segments into which the forensic mark is inserted. It is understood to those skilled person that more code sets inclusive of capital letters, small letters, special characters such as !, *, +, −, $, %, and the like, may be used as the forensic mark.

The content segment storage unit 40 may also be a database for storing one or more groups of plural first sets of content segments and one or more second sets of content segments, which are derived from an original content.

Figure 3:
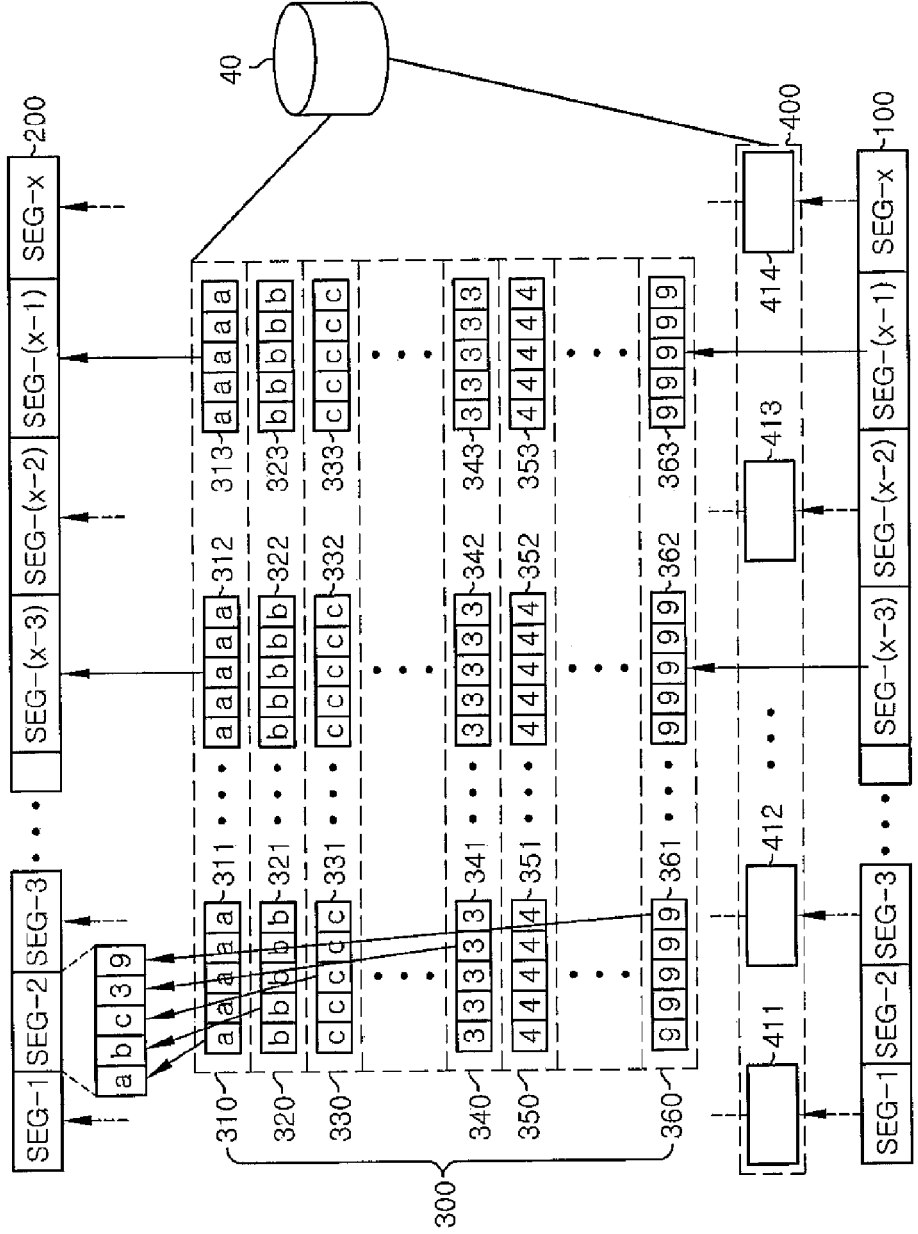
FIG. 3 shows details of a group of first sets of content segments and a set of content segments stored in the content segment storage unit.

FIG. 3 shows details of a group of first sets of content segments and a second set of content segments stored in the content segment storage unit 40.

As shown in FIG. 3, the group of first set of content segments 300 and the second set of content segments 400 may be derived from, e.g., an original content 100 including content segments SEG-1, ..., SEG-(x−1), SEG-x. In the original content 300, the content segments SEG-2, ..., SEG-(x−3), and SEG-(x−1) constitute a first set of content segments while the content segments SEG-1, SEG-3, ..., SEG-(x−2), and SEG-x constitute a second set of content segments.

The group of first sets of content segments 300 includes plural first sets of content segments 310 to 360, which are copies of the set of content segments SEG-2, ..., SEG-(x−3), and SEG-(x−1) into which a forensic mark is repeatedly inserted. The forensic mark inserted in each first set 310 to 360 differs from one another.

In the embodiment of the present invention, the forensic mark may be prepared based on a standard code table including Alphabet characters A to Z and Arabic numerals 0 to 9 such as ASCII Code, but the code string are not limited thereto.

Assuming that a forensic mark has a string of 5 codes, the group of first sets of content segments 300 is prepared in such a manner that the content segments 311, ..., 312 and 313 in a first copy 310 have a forensic mark of 'aaaaa'; the content segments 321, ..., 322 and 323 in a second copy 320 have a forensic mark of 'bbbbb'; the content segments 331, ..., 332 and 333 in a third copy 330 have a forensic mark of 'ccccc'; ...; and the content segments 361, ..., 362 and 363 in a last copy 360 have a forensic mark of '99999', as shown in FIG. 3.

When a request for content is issued from a user 90, a forensic-mark inserted content 200 corresponding to the request is obtained by partially extracting pieces from the content segments of which contents are identical in each copy and then combining the extracted pieces together.

For example, if the user 90 has an ID of "abc39", a first piece having a code 'a' in the content segment 311 in the first copy 310; a second piece having a code 'b' in the content segment 321 in the second copy 320; a third piece having a code 'c' in the content segment 331 in the third copy 330; a fourth piece having a code '3' in the content segment 341 in the fourth copy 340; and fifth piece having a code '9' in the content segment 351 in the final copy 360 are extracted. After that, the extracted first to fifth pieces are combined together to achieve a content segment 'SEG-2' which is a portion of a forensic-mark inserted content 200.

In this manner, pieces corresponding to the user ID are subjected to the extraction and the combination from the remainder of content segments of the respective copies 320 to 350 in order to achieve the respective content segments SEG-(x−3) to SEG-(x−1) in the forensic-mark inserted content 200, to thereby obtaining a first set of content segments. Thereafter, in the content assembling unit 50, the obtained first set of the content segments are assembled with the second set of content segments 411 to 414 to produce the forensic-mark inserted content 200 corresponding to the user's request.

Accordingly, by virtue of the scheme described above, when a content requested by the user 90 exists in the content segment storage unit 40, there is no additional labor to pass through the content segmentation unit 20 and the forensic mark insertion unit 30, thereby achieving a streaming service without any delays at high speed.

Referring back to FIG. 1, the communication unit 80, which may include a network interface, communicates with the user 90 who makes a request for content through the communication network 83. In the communication unit 80, a receiver 82 receives the request for content, payment information, user information and the like and sends them to the service control unit 70. A transmitter 81 transmits the forensic-mark inserted content to the user 90 who requested for content.

Figure 4:
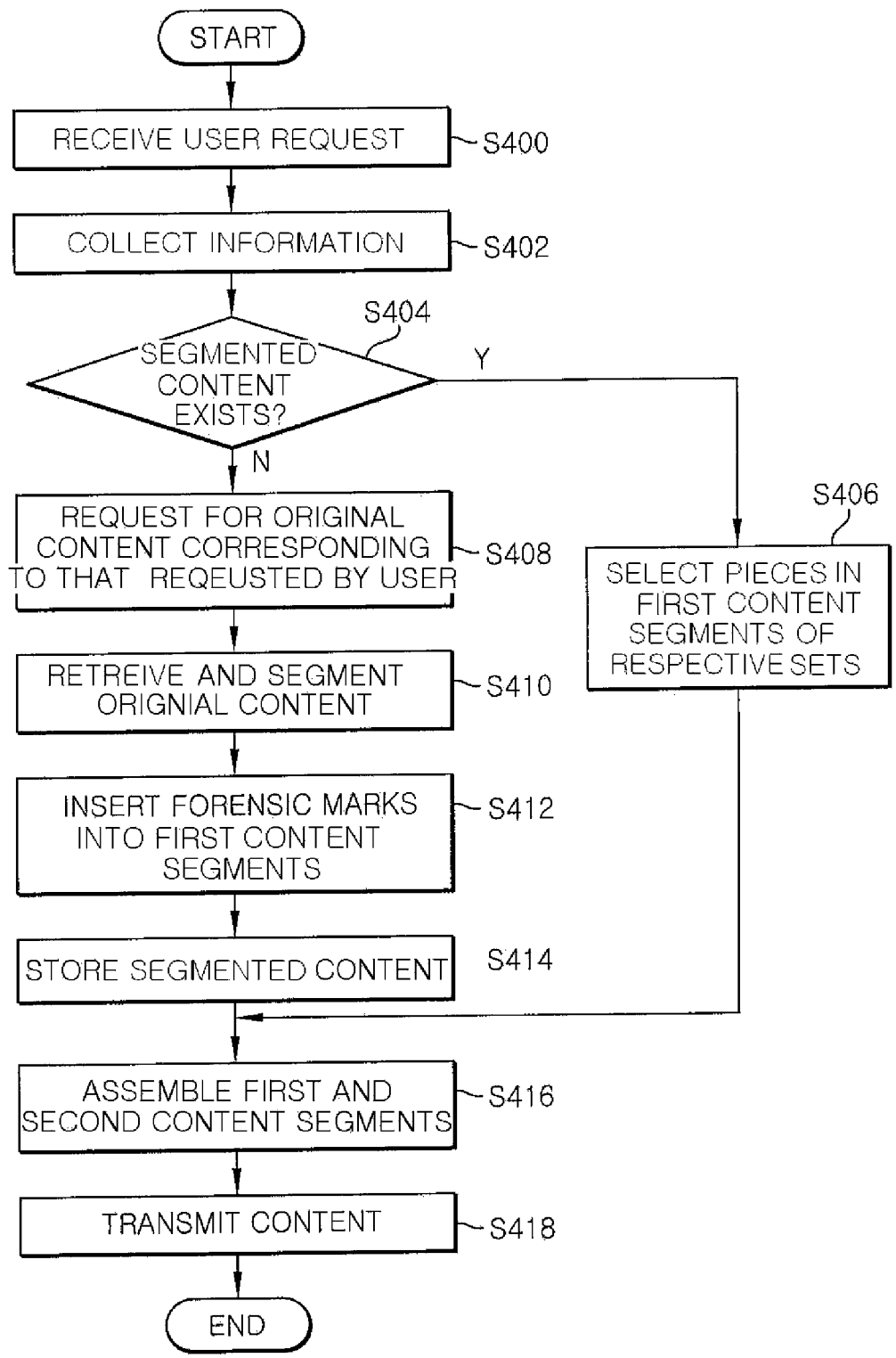
FIG. 4 depicts a flowchart showing the operation of the forensic mark insertion apparatus in accordance with an embodiment of the present invention.

FIG. 4 is a flowchart showing the operation of the forensic mark insertion apparatus in accordance with an embodiment of the present invention.

First, in step S400, when there is a request for content from a user 90, the request for content is received by the receiver 82 via the communication network 83, and is then transmitted to the collection unit 60.

In step S402, the collection unit 60 collects user information, such as the ID of the user 90 who has made the request for content, download information??, or content information of the requested content.

After the content information or the user information is collected by the collection unit 60, the content assembling unit 50 checks whether segmented contents corresponding to the request for content exists in the content segment storage unit 40, in step S404.

If it is checked that the content corresponding to the request for content is stored in the content segment storage unit 40, the process goes to step S406.

In step S406, the content assembling unit 50 extracts pieces in the first content segments of the respective sets 310 to 360 corresponding to the collected content information or the user information to obtain a set of first content segments SEG-2 to SEG-(x−1). In this step, the extraction of pieces in the first content segments 310 to 360 of the respective sets may be based on the ID of the user 90.

Next, in step S416, the content assembling unit 50 assembles the set of the first content segments formed of the selected pieces and the set of the second content segments of the original content 100 to produce the forensic-mark inserted contents 200.

Thereafter, in step S418, the content assembling unit 50 provides the forensic-mark inserted content to the transmitter 81. Thus, the transmitter 81 transmits the forensic-mark inserted content to the user 90 via the communication network 83.

Meanwhile, in step S404, if it is checked that the segmented contents corresponding to the request for content do not exist in the content segment storage unit 40, a control flow advances to step S408.

In step S408, the content assembling unit 50 sends a signal indicating a request for original content corresponding to that requested by the user 90 to the content segmentation unit 20.

Subsequently, in step S410, the content segmentation unit 20 retrieves an original content from the original content storage unit 10 corresponding to the request of the user 90 and segments the extracted original content into a plurality of content segments which is classified into first content segments into which a forensic mark is inserted and second content segments. Thereafter, the content segmentation unit 20 copies the set of content segments into which a forensic mark is inserted into duplicate sets of first content segments. The content segmentation unit 20 then decodes the sets of the first content segments to them to the forensic mark insertion unit 30. Further, the set of content segments into which the forensic mark is not inserted is copied into a set of second content segments. Thereafter, in step S412, the forensic mark insertion unit 30 inserts a forensic mark into the sets of decoded first content segments and then encodes the sets of the first content segments with the forensic mark inserted therein.

Next, in step S414, the sets of the first content segments from the forensic mark insertion unit 30 and the set of the second content segments are then stored in the content segment storage unit 40.

Then, in step S416, the content assembling unit 50 reads the stored sets of the first and second content segments from the content segment storage unit 40 to assemble them to produce a forensic-mark inserted content which has the same playback length as the original content. Finally, the forensic-mark inserted content is transmitted through the transmitter 81 to the user 90 via the communication network 83.

In this embodiment, it has been described and shown that the first content segments and the second content segments are stored in the content segment storage unit 40 in step S414. Alternatively, it may be possible to directly provide both the first and the second content segments to the content assembling unit 50 without saving them into the content segment storage unit 40.

According to the embodiments of the present invention, a forensic mark is not inserted in the entire of an original content, but into some portions of the original content, or multiple duplicate copies of an original content are prepared with forensic marks inserted therein in advance. Therefore, services for contents may be provided without any delays upon receipt of content download request or streaming service request from multiple users through an ultra-high speed communication network.

Moreover, as user or content information may be employed as a forensic mark, work management may be done more accurately and systematically than the conventional method, and it becomes easy to trace the circulation path of illegally circulated original content by using the forensic mark.

While the invention has been shown and described with respect to the particular embodiments, it will be understood by those skilled in the art that various changes and modification may be made without departing from the scope of the invention as defined in the following claims.

What is claimed is:

1. A forensic mark insertion apparatus comprising:
an original content storage hardware unit configured to store multiple original contents; and
a service control hardware unit configured to:
in response to a request for content from a user, retrieve an original content corresponding to the request from the original content storage hardware unit;
segment the retrieved original content into a plurality of content segments, wherein the plurality of content segments comprises a first set of content segments and a second set of content segments;
generate a group comprising a plurality of complete copies of the first set of content segments, the plurality of complete copies of the first set of content segments comprising a quantity of complete copies of the first set of content segments equal to a number of unique characters available to construct any given forensic mark;

generate a copy of each segment in each complete copy of the first set of content segments for each actual character in a particular forensic mark corresponding to an identifier associated with the user;

insert a unique character into each copy of each segment in each complete copy of the first set of content segments such that all segments in each complete copy of the first set of content segments are associated with a common unique character and each complete copy of the first set of content segments is associated with a different unique character;

assemble a forensic mark inserted first set of content segments by selecting appropriate complete copies of the first set of segments based on an association between a given complete copy of the first set of segments and a given actual character and selecting a given copy of a given segment in the given complete copy of the first set of segments based on a position of the given actual character in the particular forensic mark to spell the particular forensic mark; and assemble the forensic mark inserted first set of content segments and the second set of content segments not having forensic marks to produce a forensic-mark inserted content.

2. The apparatus of claim 1, wherein the service control hardware unit comprises:

a content segmentation unit configured to:
segment the retrieved original content into the first set of content segments and the second set of content segments a forensic mark insertion unit configured to:
insert the unique character into each copy of each segment to produce forensic mark inserted segments; and a content assembling unit configured to:
assemble the forensic mark inserted first set of content segments; and
assemble the forensic mark inserted first set of content segments and the second set of content segments not having forensic marks to thereby produce the forensic-mark inserted content.

3. The apparatus of claim 2, wherein the copies of the segments are decoded before inserting unique characters therein, and encoded by the same codec as that has been conducted to the original content after performing the insertion of the unique characters therein.

4. The apparatus of claim 1, further comprising:
a communication hardware unit configured to receive the request for content, and transmit the forensic-mark inserted content to the user.

5. The apparatus of claim 2, wherein the service control hardware unit further comprises:
a collection unit configured to collect information on the user,
wherein the collected information corresponds to the particular forensic mark inserted into the first set of content segments.

6. The apparatus of claim 5, wherein the collected information comprises an ID of the user.

7. A forensic mark insertion method comprising:
retrieving, in response to a request for content from a user, an original content corresponding to the request for content;

segmenting the retrieved original content into a plurality of content segments, wherein the plurality of content segments comprises a first set of content segments and a second set of content segments;

generating a group comprising a plurality of complete copies of the first set of content segments, the plurality of complete copies of the first set of content segments comprising a quantity of complete copies of the first set of content segments equal to a number of unique characters available to construct any given forensic mark;

generating a copy of each segment in each complete copy of the first set of content segments for each actual character in a particular forensic mark corresponding to an identifier associated with the user;

inserting a unique character into each copy of each segment in each complete copy of the first set of content segments such that all segments in each complete copy of the first set of content segments are associated with a common unique character and each complete copy of the first set of content segments is associated with a different unique character;

assembling forensic mark inserted set of content segments by selecting appropriate complete copies of the first set of segments based on an association between a given complete copy of the first set of segments and a given actual character and selecting a given copy of a given segment in the given complete copy of the first set of segments based on a position of the given actual character in the particular forensic mark to spell the particular forensic mark; and assembling the forensic mark inserted first set of content segments and the second set of content segments not having forensic marks to produce a forensic-mark inserted content to be provided to the user.

8. The method of claim 7, wherein the copies of the segments are decoded before inserting unique characters therein, and are encoded by the same codec as that has been conducted to the original content after inserting the unique characters therein.

9. The method of claim 7, further comprising:
collecting information on the user, wherein the collected information corresponds to the particular forensic mark inserted into the first set of content segments.

10. The method of claim 9, wherein the collected user's information comprises an ID of the user.

* * * * *